(12) United States Patent
Hojo et al.

(10) Patent No.: US 6,868,810 B2
(45) Date of Patent: Mar. 22, 2005

(54) BEARING DEVICE

(75) Inventors: Atsuo Hojo, Saitama (JP); Hiroatsu Inui, Saitama (JP); Takanori Osuka, Saitama (JP); Masashi Koyanagi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/349,084

(22) Filed: Jan. 23, 2003

(65) Prior Publication Data
US 2003/0179966 A1 Sep. 25, 2003

(30) Foreign Application Priority Data

Feb. 6, 2002 (JP) ........................................ 2002-030128
Feb. 6, 2002 (JP) ........................................ 2002-030129

(51) Int. Cl.⁷ ............................................. F16C 33/10
(52) U.S. Cl. ...................................... 123/54.4; 384/288
(58) Field of Search ...................... 384/288; 123/195 R, 123/192.1, 196 R, 197.3, 54.4

(56) References Cited
FOREIGN PATENT DOCUMENTS

| JP | 5-31039 B2 | 5/1993 |
|---|---|---|
| JP | 07-139539 A | 5/1995 |
| JP | 10030419 A * | 2/1998 ............ F01M/1/06 |

* cited by examiner

Primary Examiner—Tony M. Argenbright
Assistant Examiner—Hyder Ali
(74) Attorney, Agent, or Firm—Birch, Stewart, Kolasch & Birch, LLP

(57) ABSTRACT

To provide a bearing device for a rotary shaft which can further restrain the damage to a sliding bearing, by determining the position of a parting surface of the sliding bearing taking into account the position of the maximum pressure of an oil film. A bearing device includes a pair of sliding bearings for rotatably bearing a crankshaft of an internal combustion engine, and an oil supply passage for supplying a lubricating oil into clearances between the crankshaft and the sliding bearings. The sliding bearings are composed of bearing halves bisected at a parting surface located on a flat plane, substantially orthogonal to the direction of the maximum pressure of the oil films, formed of the lubricating oil in the clearances. The bearing device is applicable to an internal combustion engine including a cylinder having an inclined cylinder axis, which reduces the vibration and noise of the internal combustion engine.

17 Claims, 6 Drawing Sheets

BEARING DEVICE

BACKGROUND OF THE INVENTION

CROSS-REFERENCE TO RELATED APPLICATIONS

The present non-provisional application claims priority under 35 USC 119 to Japanese Patent Application No. 2002-030129 and 2002-030128 both filed on Feb. 6, 2002 the entire contents thereof is hereby incorporated by reference.

1. Field of the Invention

The present invention relates to a bearing device which includes a main bearing as a sliding bearing for rotatably bearing a rotary shaft, for example, a crankshaft of an internal combustion engine. More specifically, to a bearing device for an internal combustion engine comprising a plurality of main bearings for rotatably bearing a crankshaft of a single cylinder or multi-cylinder internal combustion engine, and particularly to a bearing device in which end portion main bearings for bearing both end portions of the crankshaft are each comprised of a sliding bearing.

2. Description of Background Art

Conventionally, where a main bearing is a sliding bearing for rotatably bearing a rotary shaft, for example, a crankshaft of an internal combustion engine, a high-pressure lubricating oil supplied to the sliding bearing fills up a radial clearance between the crankshaft and the sliding bearing to form an oil film, and the crankshaft is rotated in the state of floating up from the sliding bearing due to the presence of the oil film. Therefore, the crankshaft is restrained from making contact with the sliding bearing, and abrasion between the crankshaft and the sliding bearing is reduced.

As shown in FIG. 6, in the case where the sliding bearing 01 is composed of semi-cylindrical bearing halves 02, 02 bisected at a parting surface 03, the above-mentioned clearance 04 (in FIG. 6, the clearance 04 is drawn exaggeratedly) filled up with the lubricating oil is set to vary in the circumferential direction so that it becomes a maximum clearance 04a on a flat plane 08 containing the parting surface 03 and becomes a minimum clearance 04i on a flat plane 08 orthogonal to the flat plane 08 and containing the rotational axis 06 of the crankshaft 05, in the condition where the rotational axis 06 and the center line 07 of a circle internally touching the inside circumferential surface of the sliding bearing 01 coincide with each other (hereinafter referred to as "the base condition"). Circumferential end portions 02a, 02a; 02b, 02b of the bearing halves 02, 02 are chamfered on the inside circumferential surface sides thereof, and crash reliefs 04c, 04c for forming an additional clearance between the crankshaft 05 and a main bearing 01 are provided. By the crash reliefs 04c, 04c, the circumferential end portions 02a, 02a; 02b, 02b abutting on each other of the bearing halves 02, 02 are prevented from making contact with the crankshaft 05 by projecting radially inwards due to assembly errors or the like when the sliding bearing 01 is assembled into an engine main body.

Further, when the crankshaft is rotated in the condition where the clearance between the crankshaft and the sliding bearing is filled up with the lubricating oil, the lubricating oil flows together with the crankshaft due to its viscosity, to form a wedge-shaped oil film between the crankshaft and the sliding bearing in the direction of the load acting on the crankshaft. The crankshaft floats up due to the pressure generated by a wedge action of the oil film, and the rotational axis of the crankshaft is moved to a position spaced away by a certain distance and by a certain angle in the rotating direction from the load direction. The pressure distribution in the oil film at the sliding bearing can be determined by solving a Reynolds' equation as to the pressure distribution in the oil film. Generally, the maximum pressure is generated at a position displaced in the rotating direction of the crankshaft from the direction of the load in the base condition.

As a technology for forming an appropriate oil film on the sliding bearing which is split into two, there is known, for example, a bearing device disclosed in Japanese Patent Publication No. Hei 5-31039. The bearing device includes a sliding bearing for rotatably bearing a crankshaft of an L-type multi-cylinder engine including a front cylinder and a rear cylinder, on a crankcase. The sliding bearing, which includes a bearing housing and a lining provided on the inside of the bearing housing, is split into two at a parting surface located on a plane substantially orthogonal to a line equally bisecting the intersecting angle of the center lines of the front cylinder and the rear cylinder in side view, and is held in the crankcase splittable into upper and lower portions at a substantially horizontal parting line passing through the sliding bearing. With the position of the parting surface of the sliding bearing set in this manner, the explosion loads act on a position aloof from the parting portion of the sliding bearing, so that an appropriate oil film is formed.

As a bearing device for an internal combustion engine includes a main bearing constituted of a sliding bearing consisting of a pair of bearing halves, there have been known, for example, those disclosed in Japanese Patent Laid-open No. Hei 7-139539.

The bearing device disclosed in Japanese Patent Laid-open No. Hei 7-139539 (hereinafter referred to as "the bearing device A") comprises a pair of bisected type plain main bearing for rotatably bearing the main shaft of a series engine comprising a cylinder having a center axis (corresponding to the cylinder axis) inclined by a predetermined angle relative to the vertical line. The mating surface (corresponding to the parting surface) of the pair of bisected type plain main bearings is located on a flat plane orthogonal to the vertical line, and the eccentricity size of the bisected plain bearings is set to be not more than 0.004 mm so that the inside surface of the bearings is close to a true circle. In addition, the publication discloses also a bearing device in which the mating surface (corresponding to the parting surface) of a pair of bisected type plain main bearings is located on a flat plane orthogonal to the vertical line, namely, the center axis, in a series engine comprising a cylinder having the center line coinciding with the vertical line (hereinafter referred to as "the bearing device B").

In the sliding bearing composed of a pair of bearing halves, the position of action of the maximum pressure of the oil film depends on the magnitude of the load acting on the crankshaft, the rotating speed of the crankshaft, the viscosity of the lubricating oil, etc. Therefore, in order to suppress the pressure of the oil film acting on the circumferential end portions present in the vicinity of the parting surface, of the bearing halves, irrespective of the variation of the position of the maximum pressure, to thereby form an appropriate oil film and to restrain damage to the sliding bearing, it is preferable to set to be large the distance from the position of action of the maximum pressure of the oil film to the parting surface along the inside circumferential surface of the sliding bearing.

In addition, a periodic varying load due to the explosion load acting on the piston and an inertial force is exerted on the sliding bearing for rotatably bearing the crankshaft of the internal combustion engine, through the piston and the crankshaft. The vibration of the crankshaft arising from the varying load is transmitted to the sliding or main bearing through the oil film between the crankshaft and the sliding bearing and the oil film of the lubricating oil filling up the clearance between the crankshaft and the main bearing, and is transmitted further to the engine main body such as the crankcase holding the sliding or main bearing, to cause the vibration and noise of the internal combustion engine and to cause abrasion of the sliding or main bearing. The generation of the vibration and noise and the abrasion of the sliding or main bearing are influenced greatly by the explosion load which is generated periodically by combustion of a mixture gas in the combustion chamber and which is the maximum load of the varying load, and the direction of the explosion load substantially coincides with the cylinder axis direction of the cylinder.

In view of the above, the bearing device disclosed in Japanese Patent Publication No. Hei 5-31039 will be discussed. The parting surface of the sliding bearing is determined according to the layout of the front cylinder and the rear cylinder, and is not determined taking into account the position of the maximum pressure of the oil film generated by the load acting on the crankshaft. Furthermore, in the above-mentioned base condition, the direction of the cylinder axis passing through the rotational axis of the crankshaft is deviated largely from the direction in which the minimum clearance between the crankshaft and the sliding bearing is present, so that there is a comparatively large clearance in the cylinder axis direction. Therefore, due to the maximum load exerted in substantially the same direction as the cylinder axis direction, the flexural vibration, i.e., whirling of a journal portion which is the portion of the crankshaft borne by the sliding bearing is enlarged, and the large vibration vibrates the sliding bearing through the oil film, resulting in that vibration and noise are liable to be generated, and abrasion of the sliding bearing is liable to occur, in the prior art.

On the other hand, in the bearing device B disclosed in Japanese Patent Laid-open No. Hei 7-139539, in the base condition, the minimum clearance exists in the direction of the cylinder axis passing through the rotational axis of the crankshaft, so that the vibration of the crankshaft due to the maximum load is reduced as compared with that in the bearing device Japanese Patent Laid-open No. Hei 5-31039, resulting in that the vibration and noise generated is reduced, and the abrasion of the main bearing is suppressed. However, the bearing device B has a structure in which the flat plane containing the parting surface of the main bearing is orthogonal to the vertical line, and the internal combustion engine in which the bearing device is used is limited to an internal combustion engine having a cylinder axis coinciding with the vertical line; thus, it has not been considered to apply the bearing device B to an internal combustion engine comprising a cylinder having a cylinder axis inclined relative to the vertical line, as represented by a V-type internal combustion engine. Therefore, for the internal combustion engine comprising a cylinder having a cylinder axis inclined relative to the vertical line, the bearing device of Japanese Patent Laid-open No. Hei 7-139539 has been proposed. However, in this bearing device, a high machining accuracy is required for setting the eccentricity size of the main bearing, so that there is the problem of a raised manufacturing cost.

Besides, when the angle of inclination of the cylinder axis relative to the vertical line approaches 90°, the clearance between the crankshaft and the main bearing in the direction of the cylinder axis passing through the rotational axis of the crankshaft is enlarged, resulting in that the vibration and noise are liable to be generated, and the main bearing is liable to be abraded. Moreover, when the maximum load acts on the crash relief in the vicinity of the parting surface of the main bearing, in some cases, the lubricating oil flows out through a gap between the parting surfaces and it becomes difficult for an appropriate oil film to be formed; in an extreme case, the crankshaft and the main bearing make contact with each other, and there is the fear that the main bearing will be damaged.

In addition, since both end portions of the crankshaft are free ends, a comparatively large flexural vibration is generated at the end portions. Therefore, for the purpose of reducing the vibration and noise of the internal combustion engine, it is effective that the flexural vibration of the free end portions of the crankshaft is reduced by end portion main bearings for bearing the journal portions at the end portions (end portion journal portions), and, further, the flexural vibration of the end portion journal portions of the crankshaft due to the maximum load is reduced to thereby reduce the vibration of the end portion main bearings. Furthermore, for enhancing the durability of the bearing device comprising a plurality of main bearings for bearing the crankshaft, it is preferable to suppress not only the flexural vibration of the end portion journal portions but also the abrasion of the end portion main bearings to which the flexural vibration at the free ends is transmitted.

SUMMARY AND OBJECTS OF THE INVENTION

The present invention has been made in consideration of the above-mentioned circumstances. It is an object of the present invention to provide a bearing device which is applicable to internal combustion engines with all cylinder arrangements inclusive of a single cylinder internal combustion engine, a V-type internal combustion engine and a series multi-cylinder internal combustion engine comprising a cylinder having a cylinder axis inclined relative to the vertical line, which can reduce the vibration and noise of the internal combustion engine due to vibration of the crankshaft without depending on the angle of inclination or the direction of inclination of the cylinder axis, which can restrain the abrasion and damage of the end portion main bearings, and which is low in cost.

In addition, it is a further object of the present invention to contrive a reduction of vibration and noise and restraint of abrasion and damage of the main bearings, in a V-type internal combustion engine. It is a further object of the present invention to reduce the number of component parts and to enhance assemblability of the end portion main bearings.

It is an object of the present invention to provide a bearing device for a rotary shaft in which the position of a parting surface of a sliding bearing is determined in consideration of the position of the maximum pressure of the oil film and by which abrasion of the sliding bearing can be further restrained. It is a further object of the present invention to contrive a reduction of the vibration and noise and restraint of the abrasion and damage of the sliding bearing, in an internal combustion engine including a crankshaft on which an explosion load acts as a varying load.

The present invention is directed to a bearing device including a sliding bearing for rotatably bearing a rotary shaft receiving a varying load, and an oil supply passage for supplying a lubricating oil into a radial clearance between the rotary shaft and the sliding bearing. The sliding bearing is composed of bearing halves bisected at a parting surface, wherein the parting surface is located on a flat plane substantially orthogonal to the direction of the maximum pressure of an oil film formed of the lubricating oil in the clearance.

In this way, it is possible to secure a comparatively long distance from the position of action of the maximum pressure of the oil film to the parting surface along the inside circumferential surface of the sliding bearing. Therefore, even if the position of the maximum pressure of the oil film is moved due to such causes as the load acting on the rotary shaft and the rotating speed of the rotary shaft, the maximum pressure or a high pressure in the vicinity of the maximum pressure is inhibited, as much as possible, from acting on circumferential end portions in the vicinity of the parting surface of the bearing halves.

As a result, according to the present invention the following effects are displayed. Namely, since the sliding bearing is composed of the bearing halves bisected at the parting surface located on a flat plane, substantially orthogonal to the direction of the maximum pressure of the oil film, to permit the forming of the lubricating oil in the clearance between the rotary shaft and the sliding bearing, it is possible to secure a comparatively long distance along the inside circumferential surface of the sliding bearing from the position of action of the maximum pressure of the oil film to the parting surface. Therefore, even if the position of the maximum pressure of the oil film is moved due to such causes as the load acting on the rotary shaft and the rotating speed of the rotary shaft, the maximum pressure or a high pressure in the vicinity of the maximum pressure is inhibited, as much as possible, from acting on the circumferential end portions in the vicinity of the parting surface of the bearing halves. Accordingly, the clearance between the rotary shaft and the sliding bearing in the direction of the maximum pressure is prevented from becoming excessively large. Furthermore, outflow of the lubricating oil constituting the oil film through the gap between the parting surfaces present at the crash relief, which might occur in some cases, can be obviated, and an appropriate oil film can be formed on the sliding bearing, so that damage to the sliding bearing is restrained, and the durability of the sliding bearing is enhanced.

The present invention includes the rotary shaft that is a crankshaft of an internal combustion engine driven to rotate by a piston reciprocating in a cylinder, and a minimum clearance of the above-mentioned clearance is formed in the direction of the maximum pressure in a base condition.

In this way, the minimum clearance between the crankshaft and the sliding bearing is located in the direction of the maximum pressure of the oil film. In addition, during rotation of the crankshaft, the crankshaft is displaced to the side of the rotating direction relative to the cylinder axis direction due to the pressure of the oil film, and the direction of the varying load approaches the position of the minimum clearance. Therefore, the flexural vibration (whirling) of the journal portion of the crankshaft borne by the sliding bearing is further reduced.

As a result, according to the present invention, the following effects are displayed. Namely, the rotary shaft borne by the sliding bearing is a crankshaft of an internal combustion engine driven to rotate by a piston reciprocating in a cylinder, and the minimum clearance of the clearance is formed in the direction of the maximum pressure in the base condition. By this, the minimum clearance is located in the direction of the maximum pressure of the oil film; in addition, during rotation of the crankshaft, the crankshaft is displaced to the side of the rotating direction relative to the cylinder axis direction due to the pressure of the oil film, and the direction of the varying load approaches the position of the minimum clearance. Therefore, flexural vibration (whirling) of the journal portion of the crankshaft borne by the sliding bearing is further reduced. Accordingly, the vibration and noise of the internal combustion engine arising from the flexural vibration generated in the crankshaft by the maximum load acting on the crankshaft from the piston are reduced, and abrasion and damage of the sliding bearing arising from the flexural vibration are restrained; in this point, too, the durability of the sliding bearing is enhanced.

According to the present invention the internal combustion engine is a V-type internal combustion engine, and the crankshaft is borne by only a pair of the sliding bearings.

By this, notwithstanding the inclination angles of the cylinder axes being different, the crankshaft is borne by only the sliding bearings and the flexural vibration is reduced at the sliding bearings.

As a result, according to the present invention, the following effects are displayed. Namely, since the crankshaft of the V-type internal combustion engine is rotatably borne by only the pair of sliding bearings, the flexural vibration is reduced at all the sliding bearings bearing the crankshaft, notwithstanding the directions of the maximum pressures of the oil film at both the sliding bearings are different. Therefore, the vibration and noise of the internal combustion engine can be effectively reduced, and the abrasion and damage of all the sliding bearings are restrained, so that the durability of the bearing device is enhanced.

According to the present invention, the internal combustion engine includes a crankcase split in the axial direction of the crankshaft into first and second case portions, and the sliding bearings are pressed into the first and second case portions, respectively.

By this, the sliding bearings pressed into the first and second case portions constituting the crankcase are fixed by being pressed into the first and second case portions. As a result, according to the present invention, the following effects are displayed. Namely, the internal combustion engine includes the crankcase split in the rotational axis of the crankshaft into the first and second case portions, and the sliding bearings are pressed respectively into the first and second case portions, whereby the sliding bearings are fixed directly in the first and second case portions. Therefore, the bearing housing of the bearing device according to the prior art disclosed in the above-mentioned publication is not needed, so that the number of component parts and the number of assembling steps for fixing each of the sliding bearings to the crankcase are reduced, and the cost of the internal combustion engine can be reduced. Moreover, in what direction may the maximum pressure of the oil film be located, the sliding bearings each having a partition surface located on a flat plane substantially orthogonal to the direction of the maximum pressure of the oil film can be easily fixed to the crankcase.

Herein, the term "the base condition" means the condition where the rotational axis of the crankshaft and the center line of a circle internally touching the inside circumferential surface of the sliding bearing (namely, the bearing center axis of the sliding bearing) coincide with each other. In addition, herein, the term "substantially orthogonal" includes the case of exactly orthogonal, "substantially coinciding" includes the case of exactly coinciding, and "substantially the same" includes the case of exactly the same.

The present invention is also directed to a bearing device for an internal combustion engine comprising a plurality of main bearings for rotatably bearing a crankshaft driven to rotate by a piston reciprocated in a cylinder having a cylinder axis inclined relative to the vertical line. A pair of end portion main bearing are provided for bearing both end portions of the crankshaft of the main bearings each being comprised of a sliding bearing consisting of bearing halves bisected at a parting surface, wherein the parting surface of each of the end portion main bearings is located on a flat plane substantially orthogonal to the cylinder axis of the cylinder adjacent thereto in the axial direction of the crankshaft. A minimum clearance in the radial direction between the crankshaft and each of the end portion main bearings is formed in the direction of the cylinder axis passing through the rotational axis of the crankshaft in the base condition.

By this, in all internal combustion engines comprising a cylinder having a cylinder axis inclined relative to the vertical line, the minimum clearance between the crankshaft and the end portion main bearing is present in the direction of the cylinder axis substantially coinciding with the direction of an explosion load which is the maximum load acting on the crankshaft from the piston reciprocated in the cylinder adjacent thereto, so that flexural vibration (whirling) of end portion journal portions of the crankshaft borne by the end portion main bearings and each end portion of the crankshaft including a free end portion ranging from the end portion journal portion to the tip end of the crankshaft is reduced.

As a result, according to the present invention, the following effects are displayed. Namely, in the bearing device for the internal combustion engine comprising the cylinder having the cylinder axis inclined relative to the vertical line, the parting surface of each of the end portion main bearings which are the main bearings for bearing the end portions of the crankshaft and which are each comprised of the sliding bearing consisting of a pair of bearing halves is present on the flat plane substantially orthogonal to the cylinder axis of the cylinder adjacent thereto in the axial direction of the crankshaft, and the minimum clearance in the radial direction between the crankshaft and the end portion main bearing is formed in the direction of the cylinder axis passing through the rotational axis of the crankshaft in the base condition. In this way, since the minimum clearance between the crankshaft and the end portion main bearing is present in the direction of the cylinder axis substantially coinciding with the direction of the explosion load which is the maximum load acting on the crankshaft, the flexural vibration (whirling) of the end portion journal portions of the crankshaft borne by the end portion main bearings and each end portion of the crankshaft including the free end portion ranging from the end portion journal portion to the tip end of the crankshaft is reduced. Therefore, in internal combustion engines with all cylinder arrangements including a single cylinder internal combustion engine, a V-type internal combustion engine and a series multi-cylinder internal combustion engine comprising a cylinder having a cylinder axis inclined relative to the vertical line, the vibration and noise of the internal combustion engine arising from flexural vibration generated at the end portions of the crankshaft due to the maximum load acting on the crankshaft from the piston are reduced without depending on the angle of inclination and the direction of inclination of the cylinder axis, the abrasion and damage of the end portion main bearings arising from the flexural vibration transmitted from the crankshaft are restrained, and the durability of the bearing device comprising a plurality of main bearings for bearing the crankshaft is enhanced. Moreover, extremely rigorous size control is not required for the end portion main bearings, so that an inexpensive bearing device can be realized.

The present invention is directed to an internal combustion engine which is a V-type internal combustion engine, and the crankshaft is borne by only two above-mentioned main bearings consisting of the pair of end portion main bearings.

In this way, although the angle of inclination of the cylinder axes are different, the crankshaft is borne by only the end portion main bearings, and flexural vibration is restrained at all the main bearings.

As a result, according to the present invention, the following effects are displayed. Namely, with the crankshaft of the V-type internal combustion engine being rotatably borne by only the two main bearings consisting of the pair of end portion main bearings, flexural vibration is reduced at all the main bearings, although the angles of inclination of the cylinder axes relative to the vertical line are different. Therefore, the vibration and noise of the internal combustion engine can be reduced, the abrasion and damage of all the main bearings are reduced, and the durability of the bearing device is enhanced.

In this way, the end portion main bearings pressed into the first and second case portions constituting the crankcase are fixed directly to the first and second case portions. As a result, according to the present invention, the following effects are displayed. Namely, since the internal combustion engine comprises the crankcase bisected in the axial direction into the first and second case portions and both the end portion main bearings are fixed directly to the first and second base portions, the bearing housing used in the bearing device according to the prior art discussed above is not needed, so that the number of component parts and the number of assembling steps for fixing the crankcase to each of the end portion main bearings are reduced, and the cost of the internal combustion engine can be reduced. Moreover, whatever angle of inclination may the cylinder axis have relative to the vertical line, the end portion main bearings each include the parting surface present on a flat plane substantially orthogonal to the cylinder axis that can be easily fixed to the crankcase.

Incidentally, in the present specification, the term "the vertical line" means a straight line orthogonal to the rotational axis of the crankshaft when the rotational axis is in a horizontal condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below referring to FIGS. 1 to 5.

Figure 1:
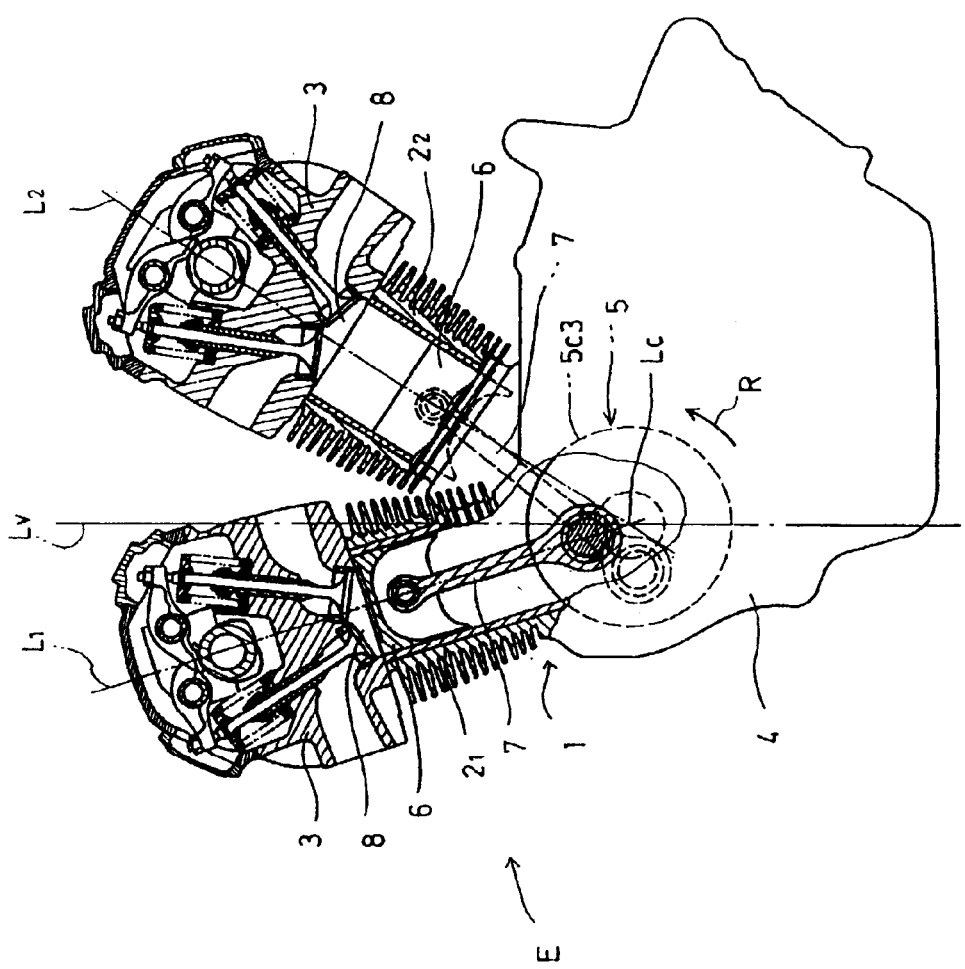
FIG. 1 illustrates the embodiment of the present invention and is a partial sectional view, in a flat plane containing the cylinder axis, of a V-type internal combustion engine to which a bearing device according to the present invention is applied.
Figure 2:
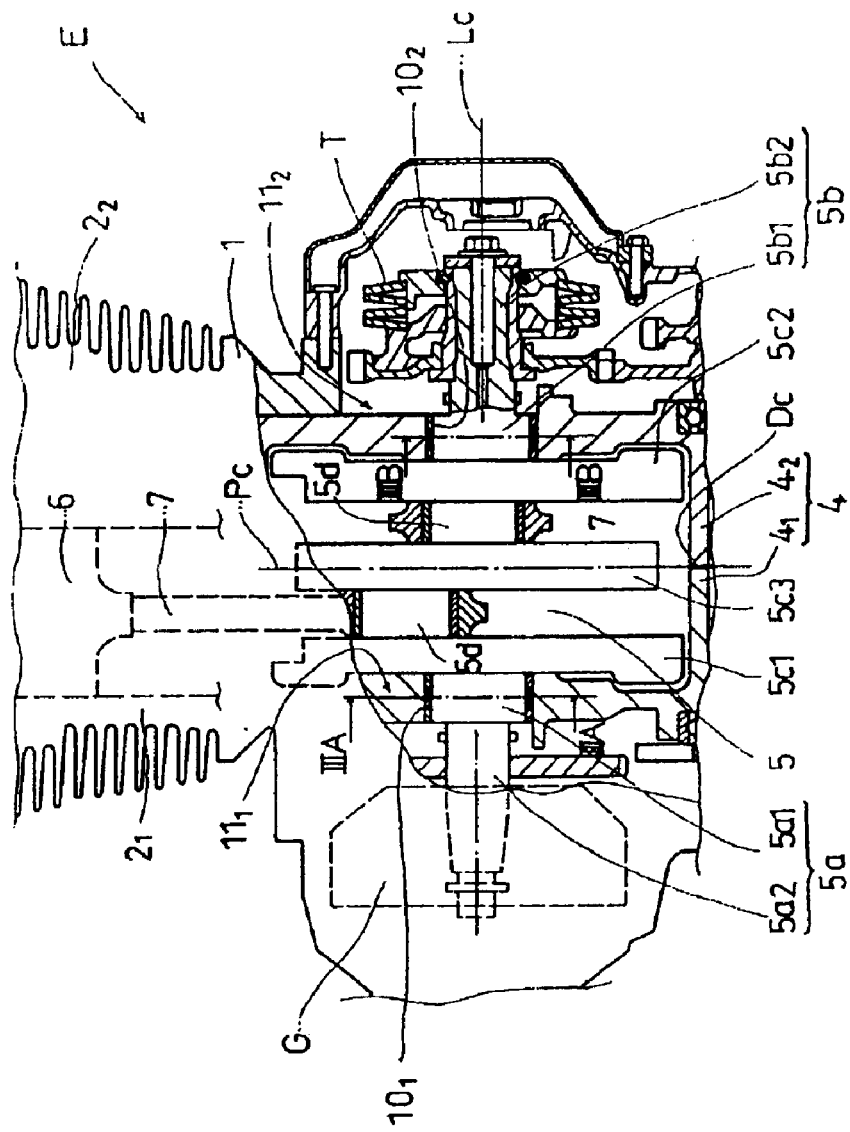
FIG. 2 is a partial sectional view of the internal combustion engine of FIG. 1, in a flat plane containing the rotational axis of the crankshaft.

In FIGS. 1 and 2, an internal combustion engine E to which a bearing device according to the present invention has been applied is shown. The internal combustion engine E is an air cooled type V-type two-cylinder internal combustion engine mounted on a motorcycle as a vehicle in the state of being horizontally disposed so that a crankshaft 5 is directed in the left-right direction. The internal combustion engine E includes a cylinder head 1 in which a front-rear pair of first and second cylinders $2_1$, $2_2$ are arranged side by side in the direction of a rotational axis Lc, namely, the axial direction of the crankshaft 5 rotated in a rotating direction R, i.e., counterclockwise in FIG. 1. The cylinder heads 1 are disposed in a V shape with a pair of cylinder heads 3, 3 connected respectively to the upper ends of the first and second cylinders $2_1$, $2_2$. A crankcase 4 is connected to the lower end of the cylinder block 1 and for forming a crank chamber together with a lower portion of the cylinder block 1.

Here, the first and second cylinders $2_1$, $2_2$ have cylinder axes $L_1$, $L_2$ inclined relative to the vertical line Lv, and both of the cylinder axes $L_1$, $L_2$ have different angles of inclination and different directions of inclination relative to the vertical line Lv.

The crankshaft 5 and a clutch and a transmission for transmitting the power of the crankshaft 5 to a driving wheel of the motorcycle are contained in the crankcase 4. The crankcase 4 is comprised of a left-right pair of first case portion $4_1$ and second case portion $4_2$ bisected in the axial direction at a parting surface Dc located on a flat plane Pc substantially orthogonal to the rotational axis Lc. The first and second cylinders $2_1$, $2_2$ and the cylinder heads 3, 3 constitute a front-rear pair of banks in a V shape. In addition, the cylinder block 1, the cylinder heads 3, 3 and the crankcase 4 constitute a main body of the engine.

The crankshaft 5, and a clutch and a transmission for transmitting the power of the crankshaft 5 to a driving wheel of the motorcycle are contained in the crankcase 4. The crankcase 4 is composed of a left-right pair of first case portion $4_1$ and second case portion $4_2$ bisected in the above-mentioned axial direction at a parting surface Dc substantially orthogonal to the rotational axis Lc. The first and second cylinders $2_1$, $2_2$ and the cylinder heads 3, 3 constitute a front-rear pair of banks in a V shape. In addition, the cylinder block 1, the cylinder heads 3, 3 and the crankcase 4 constitute an engine main body.

The crankshaft 5 is rotatably borne on the crankcase 4 through first and second sliding or main bearings $10_1$, $10_2$ which are a pair of end portions of the main bearings fixed to the first and second case portions $4_1$, $4_2$ through journal portions $5a1$, $5b1$ located at left and right end portions $5a$, $5b$ thereof. On the crankshaft 5, a first web $5c1$ adjacent to the journal portion $5a1$, a second web $5c2$ adjacent to the journal portion $5b1$, and a third web $5c3$ located between the first and second webs $5c1$ and $5c2$ are arranged side by side at intervals in the above-mentioned axial direction, between the journal portions $5a1$ and $5b1$. A crank pin $5d$ to which a connecting rod 7 connected to a piston 6 fitted in the first cylinder $2_1$ is connected is provided between the first and third webs $5c1$ and $5c3$, whereas a crank pin $5d$ to which a connecting rod 7 connected to a piston 6 fitted in the second cylinder $2_2$ is connected is provided between the second and third webs $5c2$ and $5c3$.

The pistons 6 are slidable in cylinder bores formed in the cylinders $2_1$, $2_2$, and the cylinder heads 3, 3 are provided with combustion chambers 8 communicating with the upper ends of the cylinder bores on the basis of each of the cylinders $2_1$, $2_2$. Each of the pistons 6 reciprocated by being driven by the combustion pressure generated by ignition by a spark plug of a mixture gas and combustion of the mixture gas in the combustion chambers 8 drives the crankshaft 5 to rotate through the connecting rod 7.

A left end portion $5a$, $5b$ of the crankshaft 5 is composed of the journal portion $5a1$, and a free end portion $5a2$ on the tip end side of the journal portion $5a1$, and an AV generator G is provided at the free end portion $5a2$. On the other hand, a right end portion $5a$, $5b$ of the crankshaft 5 is composed of the journal portion $5b1$, and a free end portion $5b2$ on the tip end side of the journal portion $5b1$, and a damper T for reducing torsional vibration of the crankshaft 5 is provided at the free end portion $5b2$.

Figure 3A:
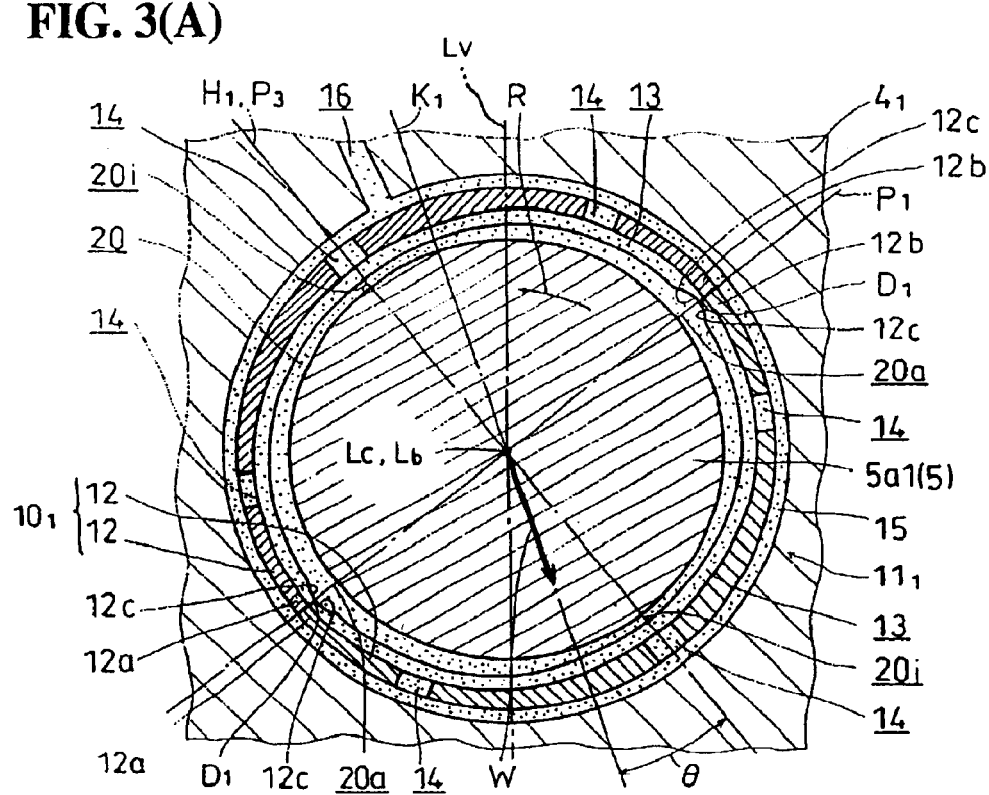
FIGS. 3(A) and 3(b) show sectional views in the condition where the crankshaft and the sliding bearings are in the base condition, in which 3(A) is a sectional view taken along line IIIA–IIIB of FIGS. 2, and 3(B) is a sectional view taken along line IIIB—IIIB of FIG. 2.
Figure 3B:
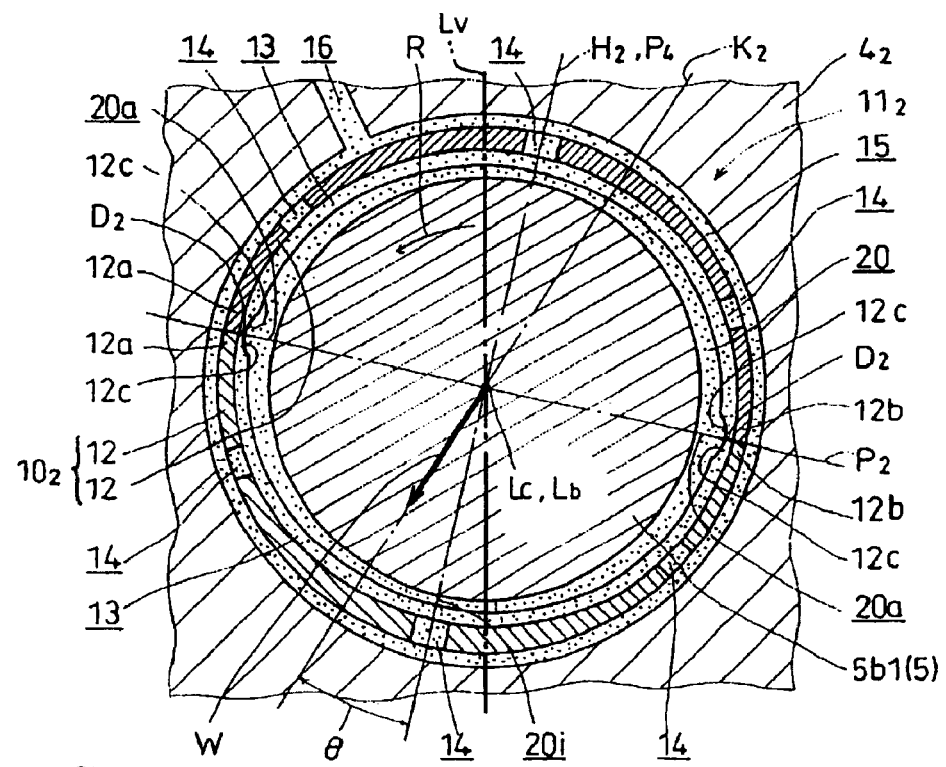

Referring to FIGS. 3(A) and 3(B) also, the first and second sliding bearings $10_1$, $10_2$ fixed by being pressed into circular holes of bearing holding portions $11_1$, $11_2$ formed respectively in the first and second case portions $4_1$, $4_2$ are each formed of a plain metal in a cylindrical shape, and are each composed of a pair of semi-cylindrical bearing halves 12, 12 bisected in the circumferential direction at parting surfaces D1, D2.

Figure 4:
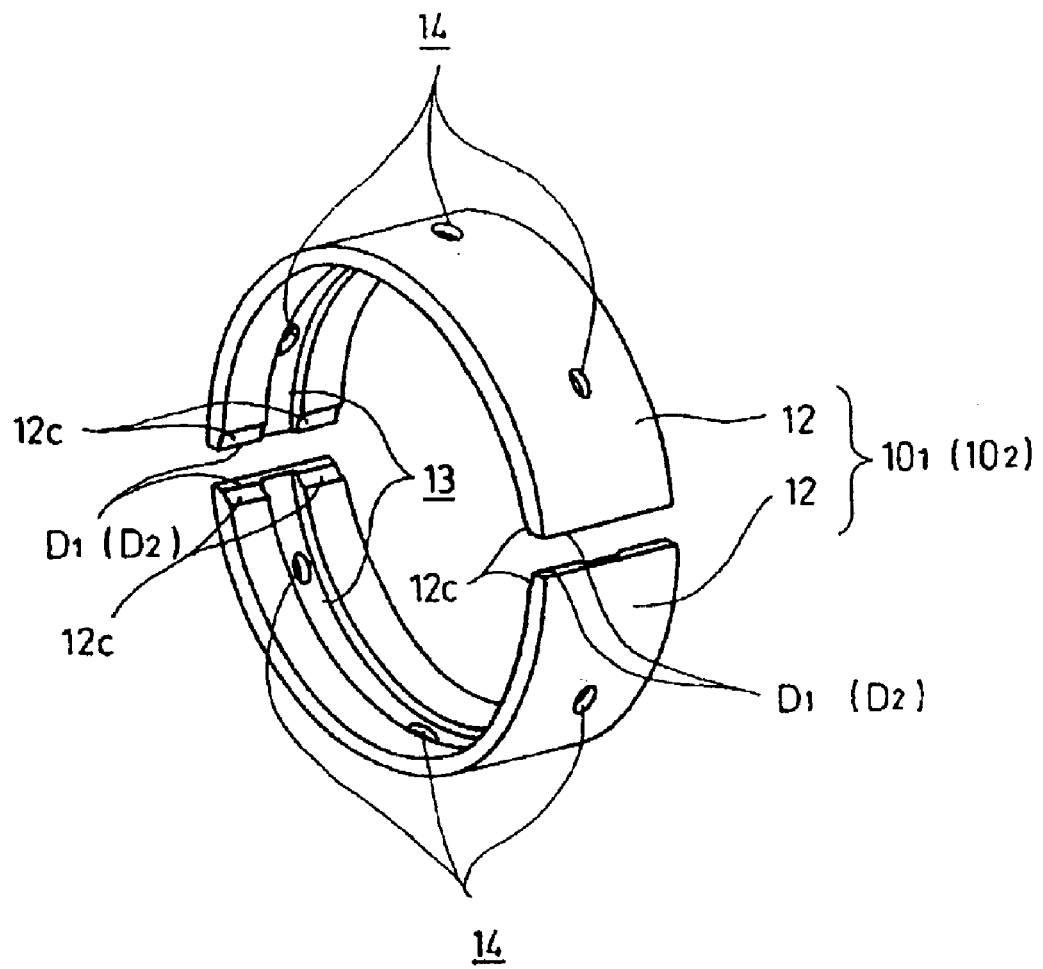
FIG. 4 is an exploded perspective view of the sliding bearing of the bearing device of FIG. 1.

Referring to FIG. 4 also, in the inside circumferential surfaces of the bearing halves 12, 12, semi-annular oil grooves 13 are located at a central portion in the above-mentioned axial direction and communicate with each other at the parting surfaces $D_1$, $D_2$, and a plurality of (in this embodiment, three) oil holes 14 . . . for communication between the outside circumferential surface of the bearing half 12, 12 and the oil groove 13 are provided. The bearing holding portions $11_1$, $11_2$ are provided with a holding portion side oil supply passage, which is composed of an annular oil groove 15 provided in a wall surface forming the circular hole and an oil hole 16 communicated with the oil groove 15. A high-pressure lubricating oil discharged from an oil pump driven by the power of the crankshaft 5 is supplied into the holding portion side oil supply passage through an oil passage which is not shown, and the lubricating oil flows through the holding portion side oil passage and the oil holes 14 . . . into the oil grooves 13, and is supplied to portions between the journal portions $5a1$, $5b1$ and the first and second sliding bearings $10_1$, $10_2$ corresponding thereto.

The high-pressure lubricating oil supplied to the sliding bearings $10_1$, $10_2$ fills up radial clearances 20 between the journal portions $5a1$, $5b1$ and the first and second sliding bearings $10_1$, $10_2$, to form oil films. Due to the presence of the oil films, the crankshaft 5 is rotated in the state of floating up from the sliding bearings $10_1$, $10_2$, whereby the crankshaft 5 is prevented from making contact with the sliding bearings $10_1$, $10_2$, and abrasion between the crankshaft 5 and the sliding bearings $10_1$, $10_2$ is reduced. Therefore, oil supply passages for supplying the lubricating oils to the clearances 20 are each composed of the bearing side oil supply passage, consisting of the oil groove 13 and the oil holes 14 . . . , and the holding portion side oil passage. Thus, the bearing device includes the first and second sliding bearings $10_1$, $10_2$, the bearing holding portions $11_1$, $11_2$, and the above-mentioned oil passages.

Meanwhile, periodic varying loads due to explosion loads acting on the pistons and inertial forces are exerted on the first and second sliding or main bearings $10_1$, $10_2$ through the crankshaft 5. Of the pistons 6 exerting the varying loads on the sliding or main bearings $10_1$, $10_2$, most influencing ones are the pistons fitted in the cylinders which are located in proximity to the sliding or main bearings $10_1$, $10_2$ in the above-mentioned axial direction, namely, the cylinders which are adjacent to the sliding bearings $10_1$, $10_2$ in the axial direction. In addition, the maximum load W of the varying loads is the explosion load periodically generated by the combustion of the mixture gas in the combustion chamber 8, and the direction of the explosion load substantially coincides with the cylinder axis direction $K_1$, $K_2$ of each of the cylinders $2_1$, $2_2$.

Figure 5:
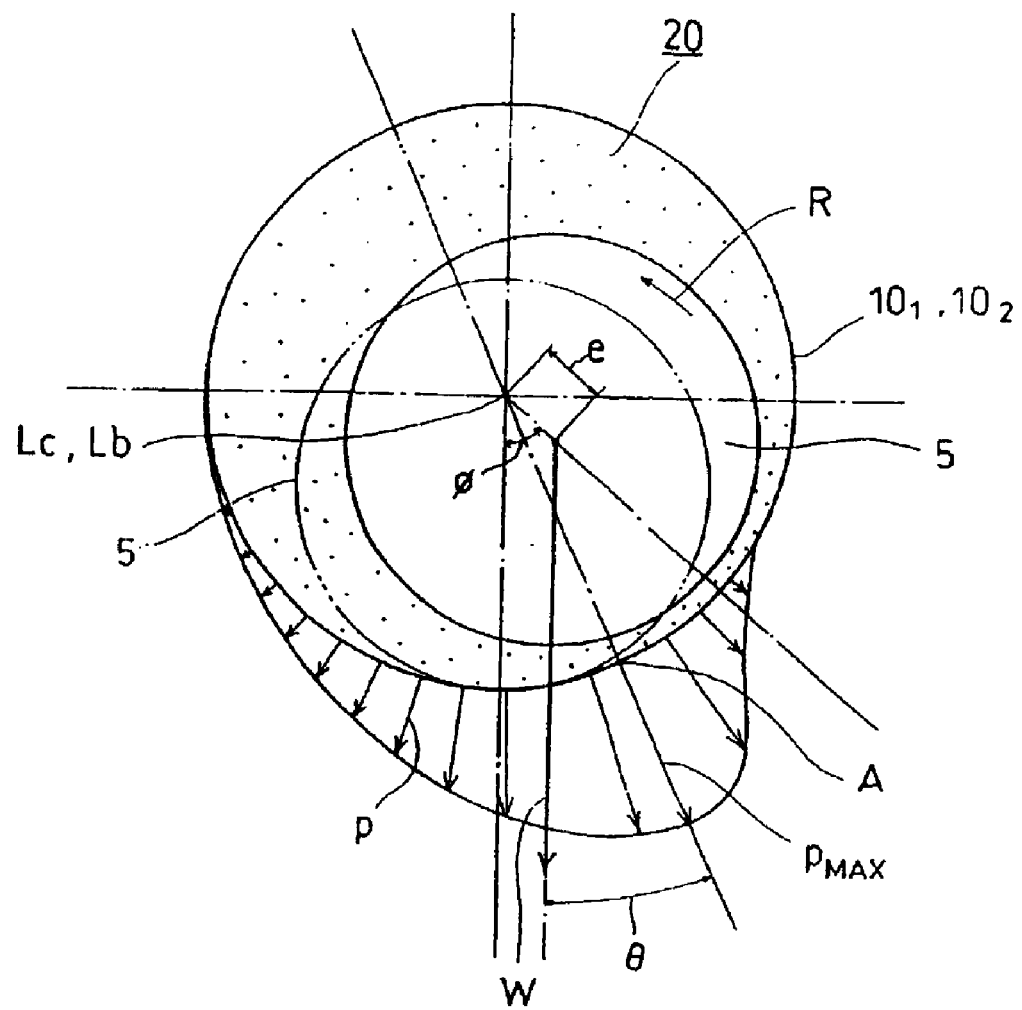
FIG. 5 is a diagram for illustrating the pressure of the oil film formed between the rotating crankshaft and the sliding bearing.
Figure 6:
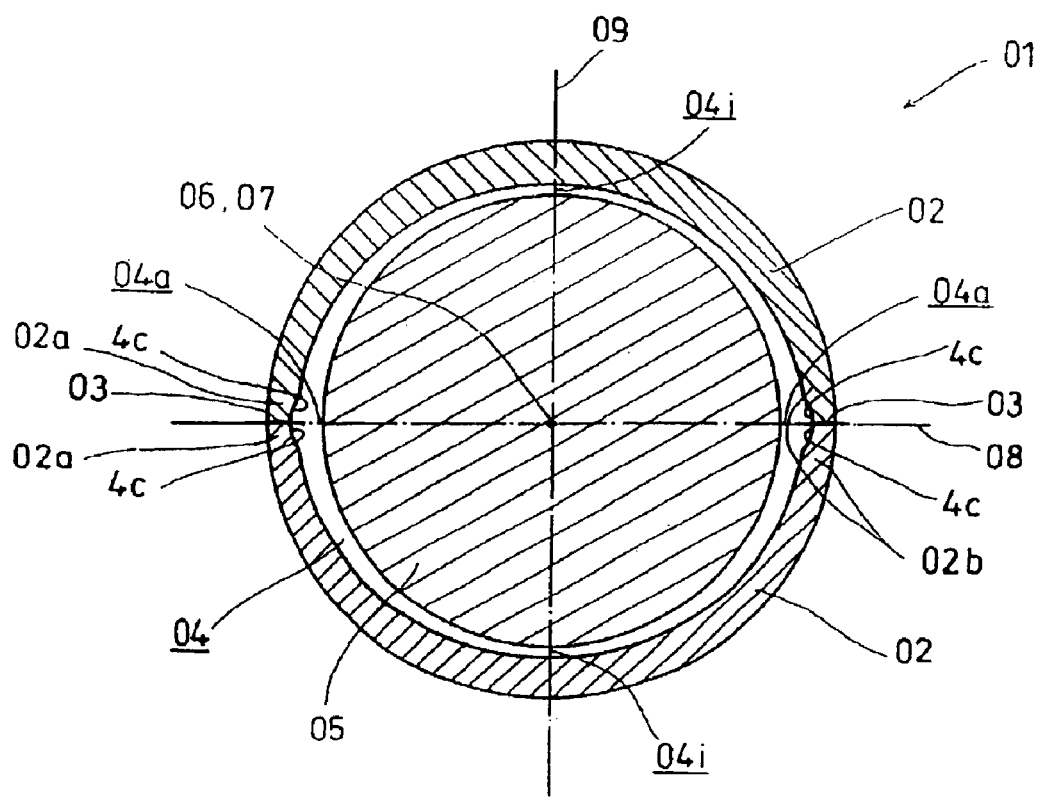
FIG. 6 illustrates the prior art, and is a general sectional view, in a flat plane orthogonal to the rotational axis of the crankshaft, of the sliding bearing in the condition where the crankshaft and the sliding bearings are in the base condition.

Furthermore, referring to FIG. 5 which is a diagram for illustrating the pressure of the oil film formed between the rotating crankshaft 5 and each sliding bearing $10_1$, $10_2$, when the crankshaft 5 is rotated in the condition where the clearance 20 between the crankshaft 5 and each sliding bearing $10_1$, $10_2$ is filled with the lubricating oil, the lubricating oil flowing together with the crankshaft 5 due to the viscosity thereof forms a wedge-shaped oil film between the crankshaft 5 and the sliding bearing $10_1$, $10_2$ in the direction of action of the varying load including the explosion load (in FIG. 5, on the lower side of the crankshaft 5). The crankshaft 5 floats up due to the pressure p generated by a wedge action of the oil film, and the rotational axis Lc of the crankshaft 5 is moved to a position deviated by a certain angle, namely, an eccentricity angle φ in the rotating direction R from the direction of the varying load in the base condition and spaced away by an eccentricity distance e.

In the sliding bearing $10_1$, $10_2$, the maximum pressure of the oil film is generated generally at the position displaced in the rotating direction R of the crankshaft 5 from the direction of the varying load in the base condition, as described above. In this embodiment, the position of the generation of the maximum pressure is determined by actually measuring the pressure of the oil film, for example, by utilizing a strain gage adhered to the vicinity of the circular hole of the bearing holding portion $11_1$, $11_2$ along the sliding bearing $10_1$, $10_2$ which has been pressed in. In this way, the position of a maximum pressure $p_{MAX}$ which is the maximum pressure in all load rotation regions of the internal combustion engine E and all load regions, namely, in all operation regions of the internal combustion engine E, when the maximum load W acts on the crankshaft 5, it can be determined and the direction of the maximum pressure $p_{MAX}$ can also be determined, taking into account the viscosity of the lubricating oil which depends on the kind of the lubricating oil and temperature variation.

FIG. 5 shows the maximum pressure $p_{MAX}$ of the oil film, the direction, and the position A of action thereof, determined in the above-mentioned manner. The maximum pressure $p_{MAX}$ has a direction rotated by an angle θ in the rotating direction from the direction of the maximum load W in the base condition, with the rotational axis Lc in the base condition as a center. The parting surface $D_1$, $D_2$ of the first and second sliding bearings $10_1$, $10_2$ are each set on a flat plane $P_1$, $P_2$ substantially orthogonal to the direction of the maximum pressure $p_{MAX}$ in each sliding bearing $10_1$, $10_2$ and containing the rotational axis Lc. Incidentally, the two dotted chain line in FIG. 5 shows the position of the crankshaft 5 when it is not rotated.

The parting surfaces $D_1$, $D_2$ of the main bearings $10_1$, $10_2$ are located on flat planes $P_1$, $P_2$ which contain the rotational axis Lc and which are substantially orthogonal to the cylinder axes $L_1$, $L_2$ of the cylinders $2_1$, $2_2$ adjacent to the main bearings $10_1$, $10_2$ in the axial direction, respectively.

More specifically, as shown in FIGS. 3(A) and 3(B) in which the clearance 20 is drawn exaggeratedly for easier understanding, the parting surface $D_1$ of the first sliding or main bearing $10_1$ is located on the flat plane $P_1$ substantially orthogonal to the direction $H_1$ of the maximum pressure $p_{MAX}$, acting in the direction rotated by the angle θ in the rotating direction R of the crankshaft 5 from the maximum load W having substantially the same direction as the cylinder axis $L_1$ (See FIG. 1) of the first cylinder $2_1$, which is the cylinder adjacent to the sliding bearing $10_1$ in the above-mentioned axial direction. The parting surface $D_2$ of the second sliding bearing $10_2$ is located on the flat plane $P_2$ substantially orthogonal to the direction $H_2$ of the maximum pressure $p_{MAX}$, acting in the direction rotated by the angle θ in the rotating direction R of the crankshaft 5 from the maximum load W having substantially the same direction as the second cylinder axis $L_2$ (See FIG. 1) of the second cylinder $2_2$, which is the cylinder adjacent to the sliding bearing $10_2$ in the axial direction. Incidentally, FIG. 3 shows the maximum load W acting on the crankshaft 5 in the base condition, namely, in the condition where the rotational axis Lc of the crankshaft 5 and the bearing center line Lb of each sliding bearing $10_1$, $10_2$ coincide with each other.

Furthermore, the radial clearance 20 between each journal portion $5a1$, $5b1$ having an outside circumferential surface consisting of a cylindrical surface and the sliding bearing $10_1$, $10_2$ corresponding thereto is set to gradually vary in the circumferential direction so that, when the pair of bearing halves 12, 12 of each sliding bearing $10_1$, $10_2$ are pressed respectively into the bearing holding portions $11_1$, $11_2$, the clearance 20 becomes a maximum clearance 20a on the flat plane $P_1$, $P_2$ containing the parting surfaces $D_1$, $D_2$ and becomes a minimum clearance 20i on a flat plane $P_3$, $P_4$ orthogonal to the flat plane $P_1$, $P_2$ and passing through the rotational axis Lc (namely, the bearing center line Lb) of the crankshaft 5, in the base condition, namely, in the condition where the rotational axis Lc of the crankshaft 5 and the bearing center line Lb of each main bearing $10_1$, $10_2$ coincide with each other when the pair of bearing halves 12, 12 of each main bearing $10_1$, $10_2$ are pressed into the bearing holding portions $11_1$, $11_2$, respectively.

As a result, the sectional shape of the inside circumferential surface of each sliding bearing $10_1$, $10_2$ in a flat plane orthogonal to the rotational axis Lc is substantially elliptic. In each of the first and second sliding bearings $10_1$, $10_2$ in the base condition, the minimum clearance 20i is formed in the direction in which the direction $H_1$, $H_2$ of the maximum pressure $p_{MAX}$ passes through the rotational axis Lc (bearing center line Lb), in other words, in the direction $H_1$, $H_2$ of the maximum pressure $p_{MAX}$ on the flat plane $P_3$, $P_4$. In addition, the minimum clearance 20$i$ is formed in the direction in which the cylinder axis direction $K_1$, $K_2$ passes through the rotational axis Lc (namely, the bearing center line Lb), in other words, in the direction of the cylinder axis direction $K_1$, $K_2$ on the flat plane $P_3$, $P_4$.

At the circumferential end portions 12$a$, 12$a$; 12$b$, 12$b$ which are the portions in the vicinity of the parting surfaces $D_1$, $D_2$ of the pair of bearing halves 12, 12, crash reliefs 12$c$, 12$c$ for forming an additional clearance between the crankshaft 5 and each main bearing $10_1$, $10_2$ are provided. With this arrangement, when the first and second main bearings $10_1$, $10_2$ are pressed into the circular holes of the bearing holding portions $11_1$, $11_2$, the circumferential end portions 12$a$, 12$a$; 12$b$, 12$b$ abutting on each other are prevented from making contact with each journal portion 5$a$1, 5$b$1 by projecting radially inwards due to assembly errors or the like.

Incidentally, at the time of assembling the crankshaft 5 into the crankcase 4, first, the first and second sliding bearings $10_1$, $10_2$ are pressed respectively into the bearing holding portions $11_1$, $11_2$, and thereafter the end portions 5$a$, 5$b$ of the crankshaft 5 are inserted into the inside of the corresponding first and second sliding bearings $10_1$, $10_2$.

Next, the actions and effects of the embodiment constituted as described above will be described.

When the internal combustion engine E is operated and the crankshaft 5 is rotated, the lubricating oil discharged from the oil pump is supplied to the first and second sliding bearings $10_1$, $10_2$ through the holding portion side oil supply passages, and the clearances 20 between the journal portions 5$a$1, 5$b$1 and the first and second sliding bearings $10_1$, $10_2$ are filled with the high-pressure lubricating oil. Therefore, the journal portions 5$a$1, 5$b$1 are borne in the floating state by the oil films formed of the lubricating oil in the clearances 20.

Thereafter, the maximum load W which is the explosion load in substantially the same direction as the cylinder axis direction $K_1$ of the first cylinder $2_1$, which is the cylinder adjacent to the first sliding bearing $10_1$ in the axial direction acts on the first sliding bearing $10_1$; while the maximum load W which is the explosion load in substantially the same direction as the cylinder axis direction $K_2$ of the second cylinder $2_2$, which is the cylinder adjacent to the second sliding bearing $10_2$ in the axial direction acts on the second sliding bearing $10_2$.

The sliding bearings $10_1$, $10_2$ are each composed of the bearing halves 12, 12 bisected at the parting surfaces $D_1$, $D_2$ located on the flat plane $P_1$, $P_2$, substantially orthogonal to the direction of the maximum pressure $p_{MAX}$ of the oil film, formed of the lubricating oil in the clearance 20 between the crankshaft 5 and the sliding bearing $10_1$, $10_2$, whereby it is possible to secure a comparatively long distance from the position of action of the maximum pressure $p_{MAX}$ to the parting surfaces $D_1$, $D_2$ along the inside circumferential surface of the sliding bearing $10_1$, $10_2$. Therefore, even if the position of the maximum pressure $p_{MAX}$ is moved by such causes as the load acting on the crankshaft 5, the rotating direction of the crankshaft 5 and the viscosity of the lubricating oil, the maximum pressure $p_{MAX}$ or a high pressure in the vicinity of the maximum pressure $p_{MAX}$ is inhibited, as much as possible, from acting on the circumferential end portions 12$a$, 12$a$; 12$b$, 12$b$ which are the portions in the vicinity of the parting surfaces D1, D2 of the bearing halves 12, 12. Therefore, the clearance 20 in the direction $H_1$, $H_2$ of the maximum pressure $p_{MAX}$ is prevented from becoming excessively high, and the lubricating oil is prevented from flowing out through the gap between the parting surfaces $D_1$, $D_2$ present at the crash reliefs 12$c$, 12$c$. Accordingly, an appropriate oil film can be formed on each sliding bearing $10_1$, $10_2$, damage to the sliding bearings $10_1$, $10_2$ is restrained, and the durability of the sliding bearings $10_1$, $10_2$ is enhanced.

Since extremely rigorous size control is not required for the main bearings $10_1$, $10_2$, an inexpensive bearing device can be realized. Incidentally, it is known that when the crankshaft 5 is rotated with the maximum load W acting thereon, a wedge-shaped oil film is formed on the lower side of the crankshaft 5, and the position of the rotational axis Lc is changed from the direction of the maximum load W to the rotational direction R (in FIGS. 3(A) and 3(B), to the right side relative to the cylinder axis direction $K_1$, $K_2$). In this case, also, the direction of the maximum load W is located in proximity to the minimum clearance 20$i$, so that the flexural vibration of the crankshaft 5 is reduced as compared with the prior art.

The crankshaft 5 of the internal combustion engine E is rotatably borne by only the pair of main bearings $10_1$, $10_2$, whereby flexural vibration is reduced at all main bearings $10_1$, $10_2$ notwithstanding the angles of inclination and the directions of inclination of the cylinder axes $L_1$, $L_2$ relative to the vertical line Lv are different, so that the vibration and noise of the internal combustion engine E can be reduced effectively. In addition, abrasion and damage of all the main bearings $10_1$, $10_2$ are restrained, so that the durability of the bearing device is enhanced.

Since the minimum clearance 20$i$ between the crankshaft 5 and each sliding bearing $10_1$, $10_2$ is formed in the direction $H_1$, $H_2$ of the maximum pressure $p_{MAX}$ in the base condition, the minimum clearance 20$i$ is in the direction $H_1$, $H_2$ of the maximum pressure $p_{MAX}$ in the base condition. In addition, during the rotation of the crankshaft 5, the crankshaft 5 is displaced in the rotating direction R (in FIGS. 3(A) and 3(B), the right side of the cylinder axis direction $K_1$, $K_2$) relative to the cylinder axis direction $K_1$, $K_2$ passing through the bearing center line Lb, and the direction of the maximum load W approaches the position of the minimum clearance 20$i$, so that the flexural vibration (whirling) of the journal portions 5$a$1, 5$b$1 of the crankshaft 5 borne by the sliding bearings $10_1$, $10_2$ is further reduced. Therefore, the vibration and noise of the internal combustion engine E arising from the flexural vibration generated in the crankshaft 5 by the maximum load W acting from the piston 6 on the crankshaft 5 are reduced; in addition, the abrasion and damage of the sliding bearings $10_1$, $10_2$ arising from the flexural vibration are restrained, so that the durability of the sliding bearings $10_1$, $10_2$ is enhanced also from this point of view.

Since the crankshaft 5 of the internal combustion engine E is rotatably borne by only the pair of sliding bearings $10_1$, $10_2$, the flexural vibration is reduced at all the sliding bearings $10_1$, $10_2$ bearing the crankshaft 5, notwithstanding that the directions $H_1$, $H_2$ of the maximum pressure $p_{MAX}$ of the oil film at both the sliding bearings $10_1$, $10_2$ are different. Therefore, the vibration and noise of the internal combustion engine E can be effectively reduced, and the abrasion and damage of all the sliding bearings $10_1$, $10_2$ are restrained, so that the durability of the bearing device is enhanced.

Further, since both end portions 5$a$, 5$b$ of the crankshaft 5 are free ends, comparatively large flexural vibration is generated at these end portions 5a, 5b. Therefore, it is effective to reduce also the flexural vibration of the free end portions 5a2, 5b2 of the crankshaft 5 by both the sliding bearings $10_1$, $10_2$ respectively bearing the end portions 5a, 5b of the crankshaft 5, for reducing the vibration and noise of the internal combustion engine E. Besides, it is preferable to restrain the abrasion of each sliding bearing $10_1$, $10_2$ due to the flexural vibration at the free end portions 5a2, 5b2, for enhancing the durability of the sliding bearings $10_1$, $10_2$. Also from this point of view, since the first and second sliding bearings $10_1$, $10_2$ are each composed of the bearing halves 12, 12 bisected at the parting surfaces $D_1$, $D_2$ located on the flat plane $P_1$, $P_2$, substantially orthogonal to the direction $H_1$, $H_2$ of the maximum pressure $p_{MAX}$ of the oil film and the minimum clearance 20i of the clearance 20, is formed in the direction $H_1$, $H_2$ of the maximum pressure $p_{MAX}$, the flexural vibration of the free end portions 5a2, 5b2 is reduced. Therefore, the vibration and noise of the internal combustion engine E arising from the flexural vibration generated at the free end portions 5a2, 5b2 are reduced, and the abrasion of the sliding bearings $10_1$, $10_2$ is restrained, whereby the durability of the sliding bearings $10_1$, $10_2$ is enhanced.

The internal combustion engine E includes the crankcase 4 split in the above-mentioned axial direction into the first and second case portions $4_1$, $4_2$, and both the sliding bearings $10_1$, $10_2$ are pressed respectively into the first and second case portions $4_1$, $4_2$, whereby both the sliding bearings $10_1$, $10_2$ are directly fixed respectively to the first and second case portions $4_1$, $4_2$. Therefore, the bearing housing of the bearing device according to the prior art as disclosed in the above-mentioned publication is not needed, so that the number of component parts and the number of assembly steps for fixing each sliding bearing $10_1$, $10_2$ to the crankcase 4 are reduced, and the cost of the internal combustion engine E is lowered. Moreover, in whatever direction that the maximum pressure $p_{MAX}$ of the oil film is present, the sliding bearings $10_1$, $10_2$ having the parting surfaces $D_1$, $D_2$ located on the flat plane $P_1$, $P_2$, substantially orthogonal to the direction $H_1$, $H_2$ of the maximum pressure $p_{MAX}$ of the oil film, can be easily fixed to the crankcase 4 and the parting surfaces $D_1$, $D_2$ located on the flat planes $P_1$, $P_2$ substantially orthogonal to the cylinder axes $L_1$, $L_2$ can be easily fixed to the crankcase 4 whatever inclination angle and inclination direction the cylinder axes $L_1$, $L_2$ may have relative to the vertical line Lv.

Now, as to an embodiment in which the constitution of a part of the above-described embodiment is modified, the modified constitution will be described below.

While the member borne by the sliding bearings $10_1$, $10_2$ has been the crankshaft of the internal combustion engine in the above-described embodiment, the sliding bearings $10_1$, $10_2$ may bear a crankshaft of an apparatus other than internal combustion engines or may bear a rotary shaft other than a crankshaft in an apparatus including an internal combustion engine.

While the internal combustion engine has been a V-type two-cylinder internal combustion engine in the above-described embodiment, the internal combustion engine may be a single cylinder internal combustion engine, a multi-cylinder internal combustion engine other than the V-type two-cylinder type, for example, a series two-cylinder internal combustion engine, not less than three cylinder series internal combustion engines or V-type internal combustion engines. In the case of the single cylinder type, the cylinders adjacent to both sliding bearings are the same cylinder. In the cases of multi-cylinder internal combustion engines including not less than two cylinders, when an intermediate sliding bearing for bearing the crankshaft between the end portion sliding or main bearings, bearing both end portions of the crankshaft, is composed of a pair of bearing halves bisected at a parting surface in the same manner as the end portion sliding or main bearings, the parting surface is set to be located on a flat plane $P_1$, $P_2$, substantially orthogonal to the direction of the maximum pressure $p_{MAX}$, generated by the maximum load from the piston acting on the intermediate sliding bearing.

While the crankcase 4 has been split in the axial direction of the crankshaft 5 in the above-described embodiment, the crankcase may be split at a parting surface consisting of a flat plane which contains the rotary axis Lc and which intersects the circular hole of the bearing holding portion. In this case, the sliding bearing composed of a pair of bearing halves is mounted on the journal portion of the crankshaft, and is then fixed in a cylindrical bearing housing which covers the outer circumference of the sliding bearing and which is splittable in two, and thereafter the crankshaft with the sliding bearing and the bearing housing assembled thereon is fixed to the crankcase.

The oil supply passage for supplying the lubricating oil into the clearances 20 between the crankshaft 5 and the sliding bearings $10_1$, $10_2$ may be constituted of an oil passage provided in the inside of the crankshaft 5, in place of the oil passage provided at the bearing holding portions as in the above-described embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bearing device comprising a sliding bearing for rotatably bearing a rotary shaft receiving a varying load, and an oil supply passage for supplying a lubricating oil into a radial clearance between said rotary shaft and said sliding bearing, said sliding bearing comprising:

bearing halves bisected at a parting surface, said parting surface being located on a flat plane substantially orthogonal to the direction of a maximum pressure of an oil film formed of said lubricating oil in said clearance;

said bearing halves being provided at inner circumferential surfaces with semi-annular oil grooves and a plurality of oil holes for communication between an outer circumferential surface and the oil grooves.

2. The bearing device as set forth in claim 1, wherein said rotary shaft is a crankshaft of an internal combustion engine driven to rotate by a piston reciprocating in a cylinder, and a minimum clearance of said clearance is formed in the direction of said maximum pressure in a base condition.

3. The bearing device as set forth in claim 2, wherein said internal combustion engine is a V-type internal combustion engine, and said crankshaft is borne by only a pair of said sliding bearings.

4. The bearing device as set forth in claim 2, wherein said internal combustion engine comprises a crankcase split in the axial direction of said crankshaft into first and second case portions, and said sliding bearings are pressed respectively into said first and second base portions.

5. The bearing device as set forth in claim 3, wherein said internal combustion engine comprises a crankcase split in the axial direction of said crankshaft into first and second case portions, and said sliding bearings are pressed respectively into said first and second base portions.

6. The bearing device as set forth in claim 1, wherein a maximum clearance of said sliding bearing is on a flat plane containing the parting surfaces of the sliding bearing.

7. The bearing device as set forth in claim 6, wherein a minimum clearance of said sliding bearing is on a flat plane orthogonal to the flat plane containing the parting surfaces of the sliding bearing.

8. The bearing device as set forth in claim 1, wherein each sliding bearing is substantially elliptical.

9. The bearing device as set forth in claim 1, wherein one of the oil holes of the bearing half is provided at the inner circumferential surface opposite to the minimum clearance.

10. A bearing device for an internal combustion engine comprising:
   a plurality of main bearings for rotatably bearing a crankshaft driven to rotate by a piston reciprocated in a cylinder having a cylinder axis inclined relative to the vertical line;
   a pair of end portion main bearings for bearing both end portions of said crankshaft of said main bearings each main bearing being comprised of a sliding bearing consisting of bearing halves bisected at a parting surface, said parting surface of each of said end portion main bearings is on a flat plane substantially orthogonal to said cylinder axis of said cylinder adjacent thereto in the axial direction of said crankshaft, and a minimum clearance in the radial direction between said crankshaft and each of said end portion main bearings is formed in the direction of said cylinder axis passing through the rotational axis of said crankshaft in a base condition;
   said bearing halves being provided at inner circumferential surfaces with semi-annular oil grooves and a plurality of oil holes for communication between an outer circumferential surface and the oil grooves.

11. The bearing device for an internal combustion engine as set forth in claim 10, wherein said internal combustion engine is a V-type internal combustion engine, and said crankshaft is borne by only two of said main bearings consisting of said pair of end portion main bearings.

12. The bearing device for internal combustion engine as set forth in claim 11, wherein said internal combustion engine comprises a crankcase split in said axial direction into first and second case portions, and both said end portion main bearings are pressed into said first and second case portions.

13. The bearing device for internal combustion engine as set forth in claim 10, wherein said internal combustion engine comprises a crankcase split in said axial direction into first and second case portions, and both said end portion main bearings are pressed into said first and second case portions.

14. The bearing device as set forth in claim 10, wherein a maximum clearance of said sliding bearing is on a flat plane containing the parting surfaces of the sliding bearing.

15. The bearing device as set forth in claim 14, wherein a minimum clearance of said sliding bearing is on a flat plane orthogonal to the flat plane containing the parting surfaces of the sliding bearing.

16. The bearing device as set forth in claim 10, wherein each sliding bearing is substantially elliptical.

17. The bearing device as set forth in claim 10, wherein one of the oil holes of the bearing half is provided at the inner circumferential surface opposite to the minimum clearance.

* * * * *